United States Patent Office 2,731,384
Patented Jan. 17, 1956

2,731,384

2-HYDROXY PYRIDINE SUBSTITUTED UREA COMPLEX

Robert C. O'Neill, New York, N. Y., and Arthur J. Basso, Colonia, N. J., assignors to Merck & Co., Inc., Rahway, N. J., a corporation of New Jersey No Drawing. Application February 28, 1955, Serial No. 491,224

9 Claims. (Cl. 167—53.1)

This invention relates to novel 2-hydroxy pyridine·substituted urea complexes and to the processes for preparing these novel compounds.

This application is a continuation-in-part of our copending application Serial No. 423,849, filed April 16, 1954, now abandoned.

It has been found that these 2-hydroxy pyridine·substituted urea complexes possess marked and effective action in the control and treatment of the disease coccidiosis which infects poultry.

The novel 2-hydroxy pyridine·substituted urea complexes with which this invention is concerned may be represented by the following structural formula:

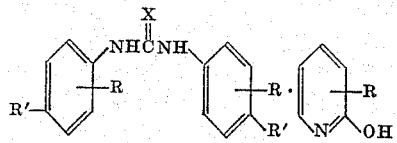

wherein R is hydrogen or a lower alkyl group, R' is an electron withdrawing group and X is oxygen or sulfur.

These 2-hydroxy pyridine·substituted urea complexes are new chemical compounds. They are equimolar complexes which have their own characteristic properties that are markedly different from the component parts and are not mere mixtures of 2-hydroxy pyridine and substituted urea compounds.

These novel 2-hydroxy pyridine·substituted urea complexes are produced by reacting a substituted urea compound represented by the formula—

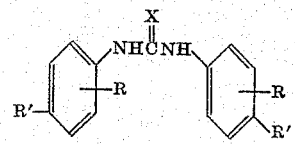

wherein R is hydrogen or a lower alkyl group, R' is an electron withdrawing group and X is oxygen or sulfur, with a 2-hydroxy pyridine compound represented by the formula—

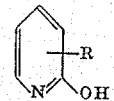

wherein R is as above.

The substituted urea compounds which may be employed as one of the starting materials in this process are carbanilide compounds having an electron withdrawing member in either or both of the 4 and 4'-positions of the rings. Examples of electron withdrawing groups which may be used are nitro, cyano, carboxy, carboalkoxy, acetyl, trimethyl ammonium, sulfonic acid and carbamido groups. Such groups are alternatively referred to as meta directing (see Fieser & Fieser, "Organic Chemistry" 2nd edition, 1950, page 595). Specific carbanilide compounds which may be employed include 4,4'-dinitrocarbanilide; 4,4'-dicyanocarbanilide; 2-methyl-4,4'-dinitrocarbanilide; 4-nitro-4'-cyanocarbanilide; 4-nitro-4'-acetocarbanilide and 4,4'-dinitrothiocarbanilide.

The complexing agents which may be employed include 2-hydroxypyridine or various 2-hydroxy alkylated pyridines such as 2-hydroxy-4-methyl-pyridine, 2-hydroxy-4-ethylpyridine, 2-hydroxy-3-methylpyridine and the like.

In accordance with one procedure for carrying out the process of this invention the solid substituted urea compound is reacted with a solution of the 2-hydroxy pyridine compound. The reaction mixture in which the substituted urea compound is ordinarily insoluble or very slightly soluble is stirred until the insoluble complex is formed. The insoluble 2-hydroxy pyridine·substituted urea complex is then filtered, washed and dried.

The reaction solvent is not critical. Ethers such as dioxane and ethyl ether, alcohols such as the lower aliphatic alcohols, hydrocarbons such as benzene, toluene, water and mixtures of such solvents may be employed satisfactorily. It has been found advantageous to employ a solvent in which the 2-hydroxy pyridine is soluble and in which the substituted urea is insoluble.

As the substituted urea compound it is preferred to employ 4,4'-dinitrocarbanilide, although carbanilides having different electron withdrawing groups in the 4 and 4'-positions may be used. Typical substituents which may be present in these positions are nitro, cyano, carboxyl and carboalkoxyl radicals. Furthermore, the electron withdrawing groups at 4 and 4'-positions need not be the same. Thus typical examples of 4,4'-disubstituted carbanilides useful in this invention are 4,4'-dinitrocarbanilide; 4,4'-dicyanocarbanilide and 4-nitro-4'-cyanocarbanilide.

The 2-hydroxy pyridine·substituted urea complexes prepared in accordance with this invention are active against the widespread poultry disease commonly called "coccidiosis" which is caused by species of protozoan parasites of the genus Eimeria. In this regard, E. tenella is responsible for a severe and frequently fatal infection of the cecum of chickens. Furthermore, other serious infections are caused in fowl by other species of Eimeria and especially E. acervulina, E. necatrix, E. Maxima and E. Brunetti. If left untreated, such infections often cause extensive losses of fowl. The control of coccidiosis is, therefore, of the utmost importance for successful poultry raising.

According to a further embodiment of this invention, novel compositions useful in the treatment of coccidiosis are provided containing the 2-hydroxy pyridine·substituted urea complex as the active ingredient. These compositions comprise the 2-hydroxy pyridine·substituted urea complex intimately combined with an inert carrier. In this regard compositions which contain a compound of the formula—

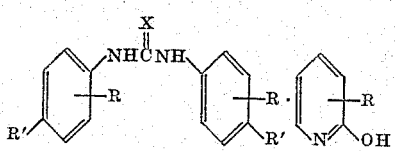

wherein R is hydrogen or lower alkyl groups, R' is an electron withdrawing group and X is oxygen or sulfur, as the active ingredient have been found to be particularly useful against coccidiosis.

These compositions comprise at least one of the 2-hydroxy pyridine·substituted urea complexes mentioned above combined with an inert carrier or diluent. Such compositions are conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert toward the active compounds and which can be administered to animals with safety. Examples of suitable carriers are ground oyster shells, attapulgus clay and edible vegetable materials such as commercial animal and poultry feeds, urea, corn meal, ground corn, citrus meal, fermentation residues and distillers dried grains. The active ingredient is conveniently dispersed in a solid carrier by conventional methods such as stirring, tumbling and grinding. In this manner, by selecting different carriers and by altering the ratio of carrier to active ingredient, compositions of varying concentration can be prepared. Compositions very suitable for addition to poultry feed may contain from about 5% to about 40% of the new coccidiostat, and preferably about 10–25%, adsorbed on or mixed with a carrier.

Premixes of 4,4'-dinitrocarbanilide-2-hydroxy pyridine complex may be prepared as referred to above in a general manner. Two satisfactory formulations are described in detail below.

A. Ingredients:
   a. 4,4'-dinitrocarbanilide·2-hydroxy pyridine complex
   b. Corn distillers dried grains
   c. Dried vitamin $B_{12}$ fermentation solubles Composition.—Each pound of the mixture preparation contains 0.30 pound of coccidiostat drug. In order to prepare 1000 pounds of feed premix the following quantities are employed:

a. 300 pounds 4,4'-dinitrocarbanilide·2-hydroxy pyridine complex
b. 175 pounds corn distillers dried grains (through 30 mesh screen)
c. 455 pounds wheat shorts (30–80 mesh)
d. 70 pounds dried vitamin $B_{12}$ fermentation solubles (30–80 mesh)

The total amount of wheat shorts and fermentation solids, and about 150 pounds of corn grains are mixed followed by the drug and the remainder of the corn grains. After mixing for about two hours the material is ready for packaging.

B. Ingredients:
   a. 4,4'-dinitrocarbanilide·2-hydroxy pyridine complex
   b. Corn distillers dried grains
   c. Wheat shorts
   d. Dried vitamin $B_{12}$ fermentation solubles Composition.—Each pound of the mixture contains 0.25 pound of coccidiostat.

Preparation.—The following quantities are employed in order to make 995 pounds of product:

a. 250 pounds 4,4'-dinitrocarbanilide·2-hydroxy pyridine complex
b. 188 pounds corn distillers dried grains (through 30 mesh screen)
c. 487 pounds wheat shorts (30–80 mesh)
d. 70 pounds dried vitamin $B_{12}$ fermentation solubles (30–80 mesh)

Products such as the above are suitable for incorporation into poultry feedstuffs in order to obtain the desired dosage level of active drug.

The amount of active ingredient required for effective prophylactic control of coccidiosis is very low. With regard to poultry, good results have been obtained by the administration of a quantity of the active ingredient equal to about 0.005% to 0.05% of the food consumed. Optimum results are usually obtained by the daily administration of a quantity of active ingredient equal to about .0075% to about .025% of the food consumed. Such relatively small amounts may be conveniently incorporated in the normal ration prior to feeding the poultry. Larger concentrations of up to about 0.1% of these new complexes may be employed therapeutically if an outbreak of the disease is encountered.

The coccidiostatic activity of compositions containing various 2-hydroxy pyridine·substituted urea complexes was experimentally demonstrated according to the following test:

Groups of ten two-week old chicks were fed a mash feed containing from 0.01% to 0.04% of the active ingredient uniformally dispersed therein. After existing on the diet for 24 hours, each chick was inoculated with 50,000 sporulated oocysts of E. tenella. In addition, groups of ten chicks were also infected but fed a diet free of the active ingredient and used as positive controls. The experiment was terminated after administering the respective diets for seven days after inoculation and the following results were obtained. The oocyst count (number of parasites of E. tenella remaining) was determined by sacrificing the birds and examining the infected organs microscopically.

TABLE I.—ANTICOCCIDIAL TESTING RESULTS

| Compound | Percent Compound in Diet | Percent Mortality | | Oocyst Count × $10^6$ | | Percent Weight Gain | |
| --- | --- | --- | --- | --- | --- | --- | --- |
| | | Treated | Untreated | Treated | Untreated | Treated | Untreated |
| 4,4'-Dinitrocarbanilide | 0.1 | 0 | 40 | 20 | 34 | 60 | 45 |
| | 0.05 | 0 | 40 | 28 | 34 | 66 | 45 |
| | 0.025 | 20 | 40 | 29 | 34 | 54 | 45 |
| 4,4'-dinitrocarbanilide·2-hydroxy-pyridine complex | 0.04 | 0 | 20 | 0.1 | 16.7 | 70 | 39 |
| | 0.02 | 0 | 20 | 5 | 16.7 | 67 | 39 |

It will be noted from Table I that 4,4'-dinitrocarbanilide when administered separated does have some activity in its own right, but such activity does not approach that displayed by the complex. The complexing agents of themselves are inactive.

The following example is intended to be illustrative only and may be varied or modified without departing from the spirit and scope of this invention:

*Example 1*

4,4'-DINITROCARBANILIDE-2-HYDROXY PYRIDINE COMPLEX

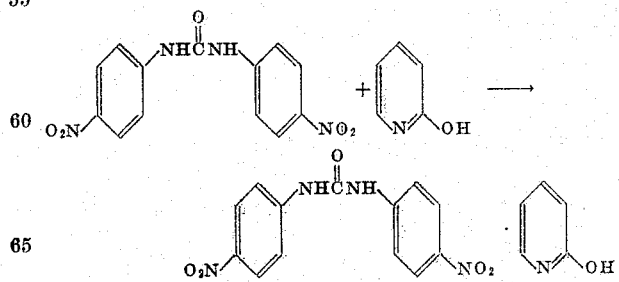

To a stirred solution of 2-hydroxy pyridine (28.5 grams; 0.3 mole) in 200 ml. of 96% ethanol and 200 ml. toluene was added 45.3 grams (0.15 mole) of 4,4'-dinitrocarbanilide. The slurry was stirred for twenty-four hours at room temperature, and filtered with vacuum. The cake was washed with ether, and dried to constant weight.

Yield=58.7 grams (98.6%); melting point 270° C. (Dec.). The 4,4'-dinitrocarbanilide·2-hydroxy pyridine complex is less intensely colored than 4,4'-dinitrocarbanilide itself.

Various changes and modifications may be made in carrying out the present invention without departing from the spirit and scope thereof. Insofar as these changes and modifications are within the purview of the annexed claims, they are to be considered as part of this invention.

What is claimed is:

1. A compound of the formula—

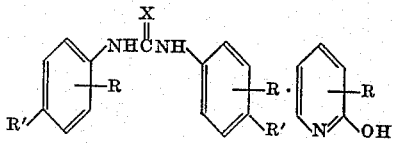

wherein R is selected from the group consisting of hydrogen and lower alkyl groups, R' is an electron withdrawing group and X is selected from the group consisting of oxygen and sulfur.

2. A compound of the formula—

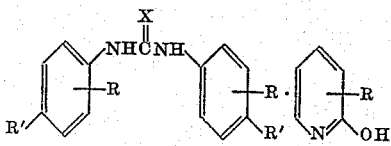

wherein R is selected from the group consisting of hydrogen and lower alkyl groups and R' is an electron withdrawing group and at least one R' is a nitro group and X is selected from the group consisting of oxygen and sulfur.

3. A compound of the formula—

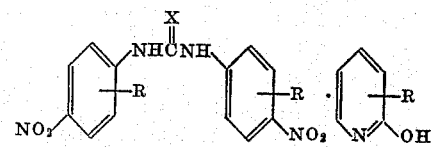

wherein R is selected from the group consisting of hydrogen and lower alkyl groups and X is selected from the group consisting of oxygen and sulfur.

4. 4,4'-dinitrocarbanilide-2-hydroxypyridine complex.

5. The process which comprises reacting a compound represented by the formula—

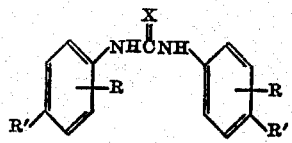

wherein R is selected from the group consisting of hydrogen and lower alkyl groups, R' is an electron withdrawing group and X is selected from the group consisting of oxygen and sulfur with 2-hydroxypyridine to form a complex represented by the formula—

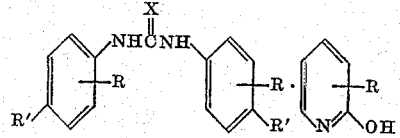

wherein R, R' and X are as above.

6. The process which comprises reacting 4,4'-dinitrocarbanilide with 2-hydroxypyridine to form 4,4'-dinitrocarbanilide·2-hydroxypyridine complex.

7. A composition useful against coccidiosis which comprises an inert carrier and a compound represented by the formula—

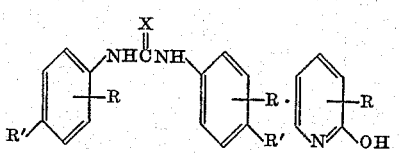

wherein R is selected from the group consisting of hydrogen and lower alkyl groups, R' is an electron withdrawing group and X is selected from the group consisting of oxygen and sulfur.

8. A composition useful against coccidiosis which comprises an animal feedstuff and a compound represented by the formula—

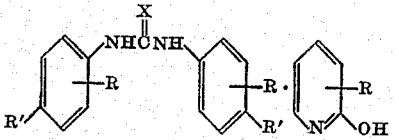

wherein R is selected from the group consisting of hydrogen and lower alkyl groups, R' is an electron withdrawing group and X is selected from the group consisting of oxygen and sulfur.

9. A composition useful against coccidiosis which comprises 4,4'-dinitrocarbanilide·2-hydroxypyridine complex intermittently dispersed in an inert carrier.

No references cited.